Jan. 21, 1969  P. A. OLSON  3,423,196
GLASS ARTICLE HAVING A BIREFRINGENCE PATTERN AND
METHOD OF PRODUCTION
Filed Aug. 18, 1965
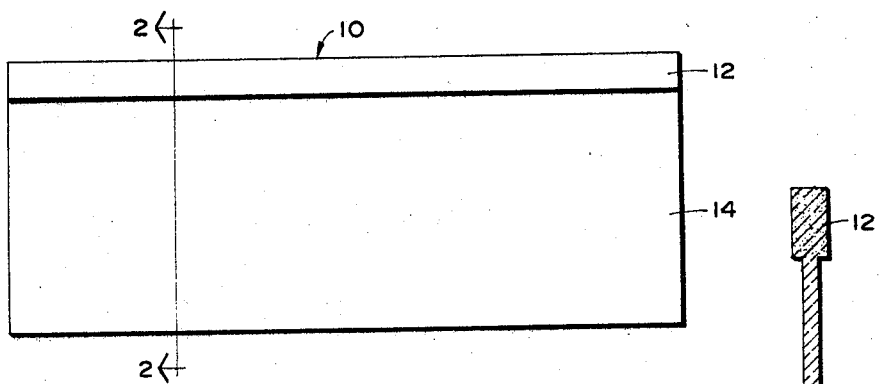
FIG. 1
FIG. 2
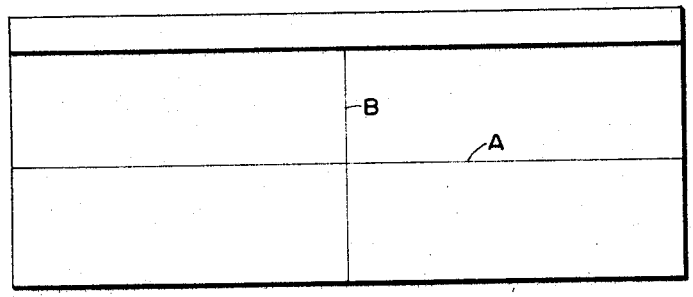
FIG. 3
INVENTOR.
Peter A. Olson
BY *Milton Peterson*
ATTORNEY

3,423,196
GLASS ARTICLE HAVING A BIREFRINGENCE PATTERN AND METHOD OF PRODUCTION
Peter A. Olson, Corning, N.Y., assignor to Corning Glass Works, Corning, N.Y., a corporation of New York
Filed Aug. 18, 1965, Ser. No. 480,604
U.S. Cl. 65—30                                  4 Claims
Int. Cl. C03c *21/00;* C03b *27/00*

The present invention relates to a glass article having a varying birefringence, and to a method of producing such article by imparting compressive stress within a selected portion of a surface zone on the article. It is particularly concerned with such a glass article having a major plane and two major axes which are generally perpendicular to one another, the article being adapted to transmit light perpendicular to the major plane and, with respect to such transmitted light, exhibiting a birefringence pattern such that the birefringence is substantially uniform along one axis and varying along the other at least over a major portion of the article.

Birefringence, or double refraction as it is sometimes termed, is a well known phenomenon in stressed transparent glass and plastic materials and in certain transparent crystalline materials, e.g. calcite crystals. The uniformity of birefringence or retardation in the natural crystal materials has led to their use in the form of prisms or wedges to provide gradient birefringence elements such as the well known compensators used in polarimeters. Other applications are currently developing in the new optical art of light amplification for articles exhibiting such varying birefringence.

A companion application filed of even date herewith by John S. McCartney with the same title as the present application and assigned to a common assignee relates generally to a glass article having a varying birefringence pattern and to a method of producing such an article. The present invention relates to an article of this nature having a specific construction that is convenient to produce and that has proven particularly useful in certain applications requiring a linear gradient of birefringence or retardation.

In accordance with the general practice described in the companion application, a surface layer in one portion of a glass plate is compressively stressed in a selective manner to produce a line of stress discontinuity. This causes a mechanical interaction in the nature of a bending moment and creates a system of secondary stresses which in turn provide the desired varying birefringence.

For certain light amplifying elements, it becomes desirable to employ glass bodies on the order of 0.050 inch thick. However the maximum degree of birefringence or retardation attainable in ordinary glass plates decreases as the plate thickness decreases below about 0.100 inch, and is relatively insignificant in thicknesses of 0.050 inch. It is a purpose of my invention to provide a solution to these problems and to produce a relatively thin glass element having a linear gradient birefringence.

The article of my invention is a thin plate of glass provided with a relatively thicker section along one edge, a surface layer of such thicker section being compressively stressed selectively with respect to the corresponding surface layer in the thin section, thereby creating a bending moment between the two glass sections and a secondary stress pattern such that the article has a uniform birefringence along an axis parallel to the compressively stressed thick segment of the article and a linear gradient pattern of birefringence along an axis perpendicular thereto. The invention further resides in a method of producing such article by a selective ion exchange in the thicker section of the glass.

The invention is further described with reference to the accompanying drawing wherein, FIGURE 1 is a side view of a glass element in accordance with the invention, FIGURE 2 is a cross sectional view along line 2—2 of FIGURE 1, and FIGURE 3 is a schematic diagram of the birefringence pattern in the element of FIGURES 1 and 2.

As illustratively shown in FIGURES 1 and 2, a device in accordance with the invention, generally designated by the numeral 10, may be formed from a rectangular glass plate having a relatively large portion 14 and a smaller edge portion 12. Portion 14 is relatively thin and will normally have a thickness under 0.075", preferably about 0.050". Edge portion 12 is substantially thicker and will normally be within the range of 0.075–0.125", preferably at least 0.100".

The glass structure may be molded in the form shown in FIGURES 1 and 2. Alternatively, an element may be cut from a plate or sheet of uniform thickness and selectively reduced in thickness to provide thin portion 14. This may be accomplished by either mechanical grinding or chemical etching in known manner. For example, a plate of 0.100" thick glass may have a quarter inch zone along one edge waxed and then be immersed in an HF bath to reduce the thickness of the unwaxed portion of the glass.

Portion 12 of the glass element may be compressively stressed in accordance with any of several known procedures. However, I have found that an ion exchange procedure, wherein a large ion is exchanged for a small ion below the glass transformation or stress release temperature range, is particularly convenient. In such practice, the glass body is suspended in such manner that only the thicker portion 12 is immersed in a suitable molten salt bath. Alternatively, the surface of portion 12 might be selectively coated with a paste containing a salt of the desired exchange ion, e.g. a sodium nitrate salt in case of a lithia containing glass.

The exchange of ions within a surface zone of portion 12 creates a primary stress pattern consisting of compressive stresses in the surface zone and balancing tension stresses in the interior. With respect to light transmitted normal to the major glass surface, this system of primary stresses has no net effect on the birefringent or retardation characteristics. However, the existence of these primary stresses does create a bending moment across the line of stress discontinuity between portions 12 and 14 of the glass element. As a result there is created a system of secondary stresses which establish the desired retardation pattern.

This pattern and its relationship to the glass article geometry is described with reference to FIGURE 3 of the drawing. Horizontal line A may be considered as representing either a major axis of the glass article or a line parallel thereto. Measured along such lines the retardation effect on light transmitted at any point normal thereto will be essentially uniform. Likewise, vertical line B may be considered as the second major axis, or a line parallel thereto. Along such line, the retardation varies in a linear manner. The rate of increase along line B will depend on the magnitude of the primary stresses which in turn will depend on the degree of the ion exchange treatment. Thus, under optimum conditions, a retardation gradient or increase of up to about 300 millimicrons per inch has been produced.

It should be understood that the thin portion 14 of the glass structure need not be completely free from primary, or surface compressive, stresses such as described with reference to portion 12. However, it is essential that there be a substantial difference in the degree of stress imparted in the surface zones on the two portions of the glass. Actually, in order to minimize fragility of the structure, it will be desirable to immerse the entire glass structure in a salt bath for a mild strengthening treatment prior to the further treatment of the thicker portion 12.

The invention is further described with reference to the production of a specific embodiment thereof:

A two by five inch rectangular section was cut from a 0.100 inch thick ribbon of a silicate glass having the following approximate composition by weight 62.0 $SiO_2$, 24.2 $Al_2O_3$, 7.2 $Na_2O$, 0.1 $K_2O$, 3.6 $Li_2O$, 1.9 MgO and 1.0 $Sb_2O_3$. A one-quarter inch zone at one end of the plate was coated with paraffin wax, thus leaving a one and three-quarter inch by five inch exposed area on each face of the glass plate. The partially coated plate was then immersed in a 25 percent solution of hydrofluoric acid for a sufficient time to remove about 0.025 inch of glass from each exposed surface, thus reducing the thickness of the exposed portion of the glass plate by about one-half.

After the etching step, the plate was washed, dried, and the wax resist removed from the unetched end portion corresponding to portion 12 in FIGURE 2. The glass article was then mechanically suspended above a molten bath of sodium nitrate with only the unetched portion 12 immersed in the bath. The glass article was thus subjected to a selective ion exchange treatment for a period of sixteen hours while the bath was maintained at a temperature of 450° C.

Following such treatment it was observed that the article had a linear gradient of retardation along a line corresponding to line B of FIGURE 3 equal to about 214 millimicrons per inch. Correspondingly, the retardation characteristics along a perpendicular line corresponding to line A of FIGURE 3 were substantially uniform. Subsequent experiments indicated that a maximum gradient could be obtained with an ion exchange treatment of about 30 hours.

It will be understood by those familiar with the art involved that numerous variations and modifications may be made within the scope of the appended claims. For example, a variety of different glasses, structural geometry, and glass treatments may be employed to produce articles within the scope of the invention.

I claim:

1. A method of producing a birefringence element having a linear gradient of birefringence with respect to at least a portion of one major axis when light is transmitted normal to the major surface of the element, the method comprising providing a thin glass plate having a relatively thicker portion along one edge thereof, and selectively developing compressive stress within a surface layer on said thicker portion of the glass plate with respect to a corresponding surface layer of the thinner section.

2. A method in accordance with claim 1 wherein the glass plate is formed from a silicate glass containing lithium ions and the surface layer of the thicker section is compressively stressed by exchanging a portion of the lithium ions therefrom with monovalent ions having a relatively larger ionic diameter.

3. A method in accordance with claim 2 wherein the entire surface of the glass article is subjected to a relatively short ion exchange treatment and the thicker section is selectively exposed to a longer ion exchange treatment.

4. A method for making a birefringence element having a linear gradient of birefringence with respect to at least a portion of one major axis when light is transmitted normal to the major surface of the element comprising the steps of:
   (a) forming a thin plate having a relatively thicker portion along one edge thereof from an alkali metal silicate glass wherein said alkali metal is lithium and/or sodium; and
   (b) contacting said thicker portion of the plate with a source of alkali metal ions having a larger ionic diameter than the alkali metal in the glass at a temperature below the strain point of the glass for a sufficient length of time to cause the exchange of said larger ions for at least a part of the smaller alkali metal ions in a surface layer of said thicker portion, thereby effecting a compressively stressed surface layer in said thicker portion.

References Cited

UNITED STATES PATENTS

| 2,256,093 | 9/1941 | Land | 40—130 |
| 3,287,200 | 11/1966 | Hess et al. | 161—1 |

OTHER REFERENCES

S. S. Kistler, "Stress in Glass Produced by Nonuniform Exchange of Monovalent Ions," Journal of the American Ceramic Society, vol. 45, February 1962, pp. 59–68.

DONALD H. SYLVESTER, *Primary Examiner.*

JOHN H. HARMAN, *Assistant Examiner.*

U.S. Cl. X.R.

65—114; 350—157